(12) United States Patent
Hsu

(10) Patent No.: US 12,013,576 B2
(45) Date of Patent: Jun. 18, 2024

(54) OPTICAL FIBER ADAPTER

(71) Applicant: Gloriole Electroptic Technology Corp., Kaohsiung (TW)

(72) Inventor: Hsien-Hsin Hsu, Kaohsiung (TW)

(73) Assignee: GLORIOLE ELECTROPTIC TECHNOLOGY CORP., Kaohsiung (TW)

( * ) Notice: Subject to any disclaimer, the term of this patent is extended or adjusted under 35 U.S.C. 154(b) by 195 days.

(21) Appl. No.: 17/864,005

(22) Filed: Jul. 13, 2022

(65) Prior Publication Data
US 2023/0168437 A1 Jun. 1, 2023

(30) Foreign Application Priority Data

Nov. 29, 2021 (TW) .................................. 110214158

(51) Int. Cl.
G02B 6/38 (2006.01)
(52) U.S. Cl.
CPC ......... G02B 6/3825 (2013.01); G02B 6/3831 (2013.01)
(58) Field of Classification Search
CPC .................................................. G02B 6/3825
See application file for complete search history.

(56) References Cited

U.S. PATENT DOCUMENTS

| | | | | |
|---|---|---|---|---|
| 5,317,663 A * | 5/1994 | Beard | .................. | G02B 6/3825 385/70 |
| 5,333,222 A * | 7/1994 | Belenkiy | .............. | G02B 6/3825 385/70 |
| 5,359,688 A * | 10/1994 | Underwood | ......... | G02B 6/3825 385/60 |
| 5,737,464 A * | 4/1998 | Underwood | ......... | G02B 6/3874 385/60 |
| 7,377,697 B2 * | 5/2008 | Kahle | .................. | G02B 6/3825 385/56 |
| 9,316,794 B2 * | 4/2016 | Chen | ..................... | G02B 6/3825 |
| 9,599,779 B2 * | 3/2017 | Lee | ....................... | G02B 6/3897 |
| 10,197,741 B2 * | 2/2019 | Nelson | ................. | G02B 6/3865 |
| 10,281,668 B2 * | 5/2019 | Takano | ................ | G02B 6/3893 |
| 10,746,940 B2 * | 8/2020 | Hsu | ....................... | G02B 6/3825 |
| 11,262,507 B2 * | 3/2022 | Nelson | ................. | G02B 6/3834 |
| 2006/0093274 A1 * | 5/2006 | Kahle | .................. | G02B 6/3874 385/72 |
| 2010/0278497 A1 * | 11/2010 | Hsu | ..................... | G02B 6/3825 385/134 |

(Continued)

FOREIGN PATENT DOCUMENTS

WO WO-2012162385 A1 * 11/2012 ........... G02B 6/3825

*Primary Examiner* — Michelle R Connelly
(74) *Attorney, Agent, or Firm* — MUNCY, GEISSLER, OLDS & LOWE, P.C.

(57) ABSTRACT

An optical fiber adapter includes a housing, a positioning member disposed in the housing, and a clip member removably disposed in the housing. The housing includes two outer walls each formed with slots, two side walls each connected between the outer walls, and latches extending from a corresponding one of the outer walls into a corresponding one of the slots. The clip member includes a base portion, two connection portions disposed on two opposite ends of the base portion, and two pairs of clip arm portions extending from the connection portions. Each connection portion has an engaging groove engaged with a respective one of the latches.

5 Claims, 7 Drawing Sheets

(56) References Cited

U.S. PATENT DOCUMENTS

| | | | |
|---|---|---|---|
| 2012/0301080 A1* | 11/2012 | Gniadek | G02B 6/3825 |
| | | | 385/56 |
| 2016/0011383 A1* | 1/2016 | Lee | G02B 6/3897 |
| | | | 385/75 |
| 2020/0018909 A1* | 1/2020 | Chang | G02B 6/421 |
| 2020/0310041 A1* | 10/2020 | Chang | G02B 6/3893 |
| 2021/0124129 A1* | 4/2021 | Liu | G02B 6/387 |
| 2021/0263238 A1* | 8/2021 | Tseng | G02B 6/3869 |
| 2022/0137305 A1* | 5/2022 | Tseng | G02B 6/3831 |
| | | | 385/134 |
| 2022/0236494 A1* | 7/2022 | Hsu | G02B 6/3831 |

* cited by examiner

OPTICAL FIBER ADAPTER

CROSS-REFERENCE TO RELATED APPLICATION

This application claims priority to Taiwanese Patent Application No. 110214158, filed on Nov. 29, 2021.

FIELD

The disclosure relates to an adapter, and more particularly to an optical fiber adapter.

BACKGROUND

In general, an optical fiber adapter is connected to different types of optical connectors through front and rear slots thereof, so that the optical connectors can be signally connected to each other through the optical fiber adapter. To conform with specific configurations of the optical connectors, an existing optical fiber adapter includes a plurality of clip members disposed therein. The clip members can serve as positioning interfaces of and connect the optical connectors. Each clip member is removably inserted into the optical fiber adapter, and has a latch extending outwardly of and engaged with an inner wall of the optical fiber adapter. However, to remove a corresponding one of the clip members, a user has to push the latch of the corresponding clip member to move inwardly away from the inner wall for disengagement of the latch from the inner wall. It is inconvenient for the user to remove the corresponding clip member, and the user may be impatient to pull strongly the corresponding clip member out of the optical fiber adapter, thereby resulting in the damage to the corresponding clip member.

SUMMARY

Therefore, the disclosure is to provide an optical fiber adapter that can alleviate at least the drawback of the prior art.

According to the disclosure, an optical fiber adapter includes a housing, a positioning member, and at least one clip member.

The housing includes two outer walls, two side walls, and a plurality of latches. The outer walls are spaced apart from each other in a top-bottom direction. Each of the outer walls is formed with a plurality of slots spaced apart from each other in a lateral direction. The side walls extend in the top-bottom direction, such that each of the side walls is connected between the outer walls. The latches are disposed on the outer walls. Each of the latches extends from a corresponding one of the outer walls in a front-rear direction into a corresponding one of the slots. The outer walls and the side walls surround and define a channel extending in the front-rear direction and in spatial communication with the slots.

The positioning member is disposed within the channel and extends in the lateral direction.

The at least one clip member is removably disposed within the channel, and includes a base portion, two connection portions, and two pairs of clip arm portions. The base portion extends in the top-bottom direction. The two connection portions are respectively disposed on two ends of the base portion opposite to each other in the top-bottom direction. Each of the connection portions has an engaging groove that is indented inwardly therein and that is engaged with a respective one of the latches. The two pairs of clip arm portions extend respectively from the connection portions in the front-rear direction. The clip arm portions of each pair extend away from each other.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
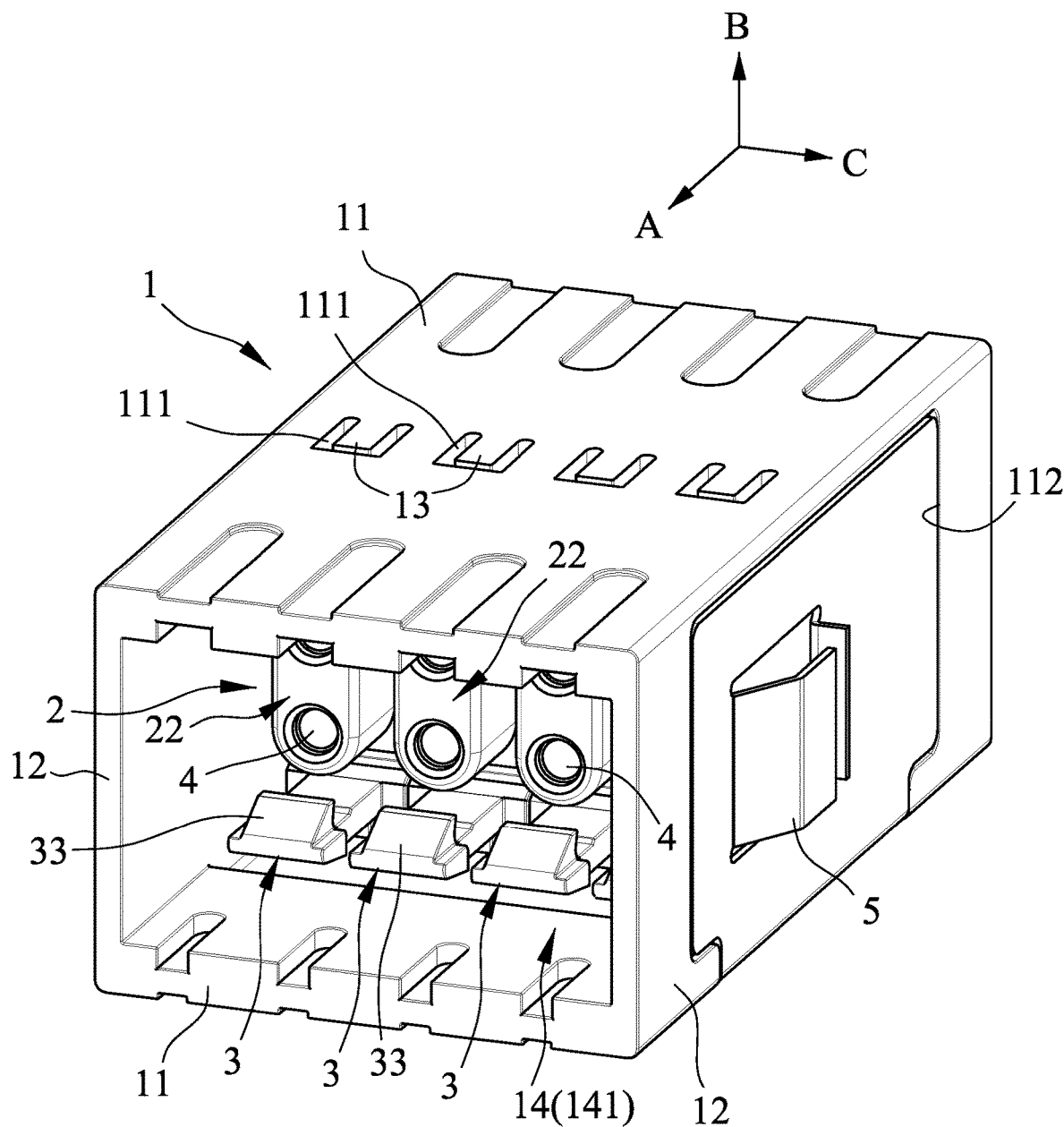
FIG. 1 is a front perspective view illustrating an optical fiber adapter according to an embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, an optical fiber adapter according to an embodiment of the disclosure includes a housing 1, a positioning member 2 disposed in the housing 1, four clip members 3 (three are shown in FIG. 1) that are removably disposed in the housing 1 and removable from the housing 1 in a front-rear direction (A), and eight sleeves 4 inserted into the positioning member 2 and the clip members 3.

Figure 2:
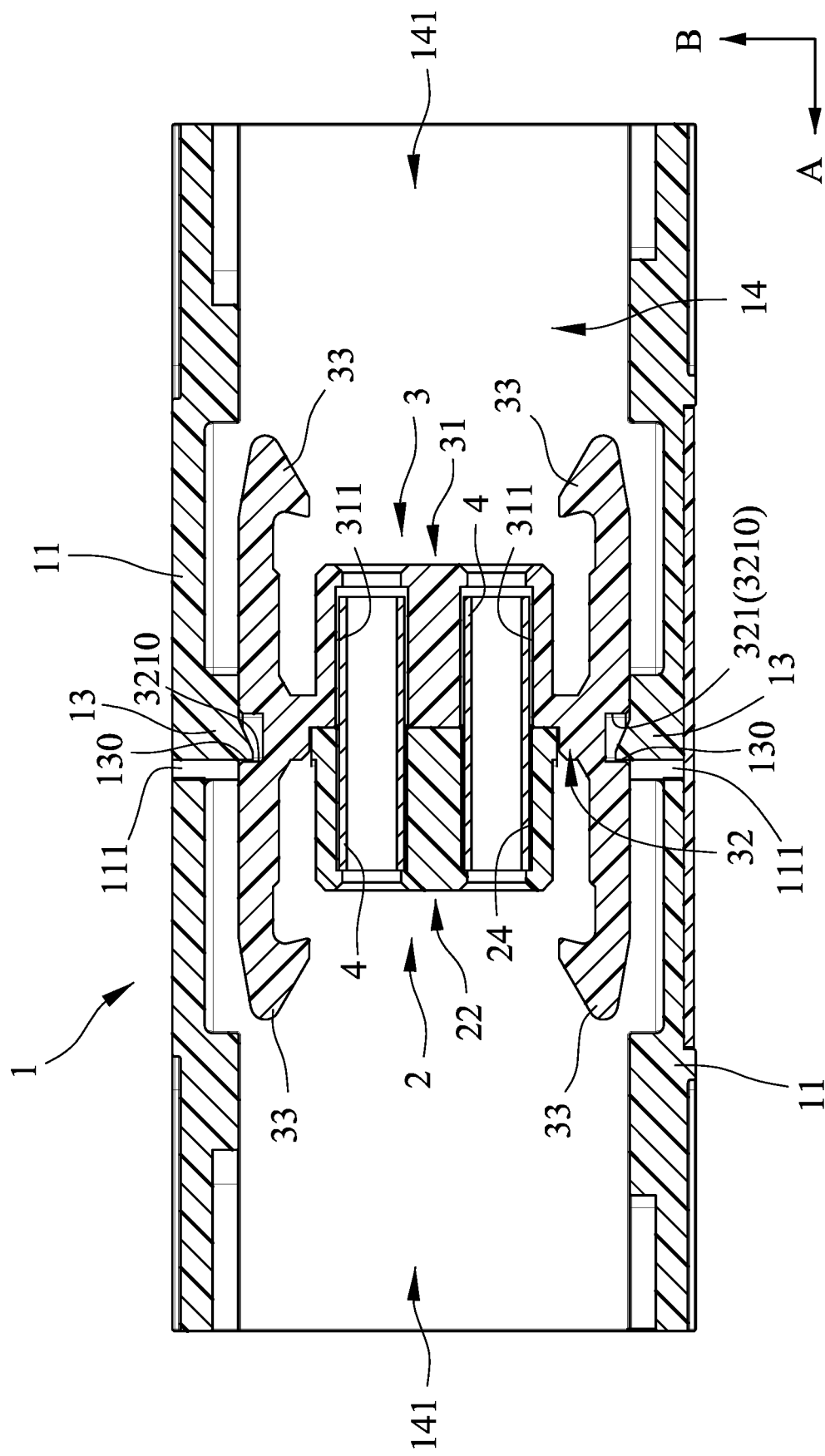
FIG. 2 is a sectional side view of the embodiment.
Figure 4:
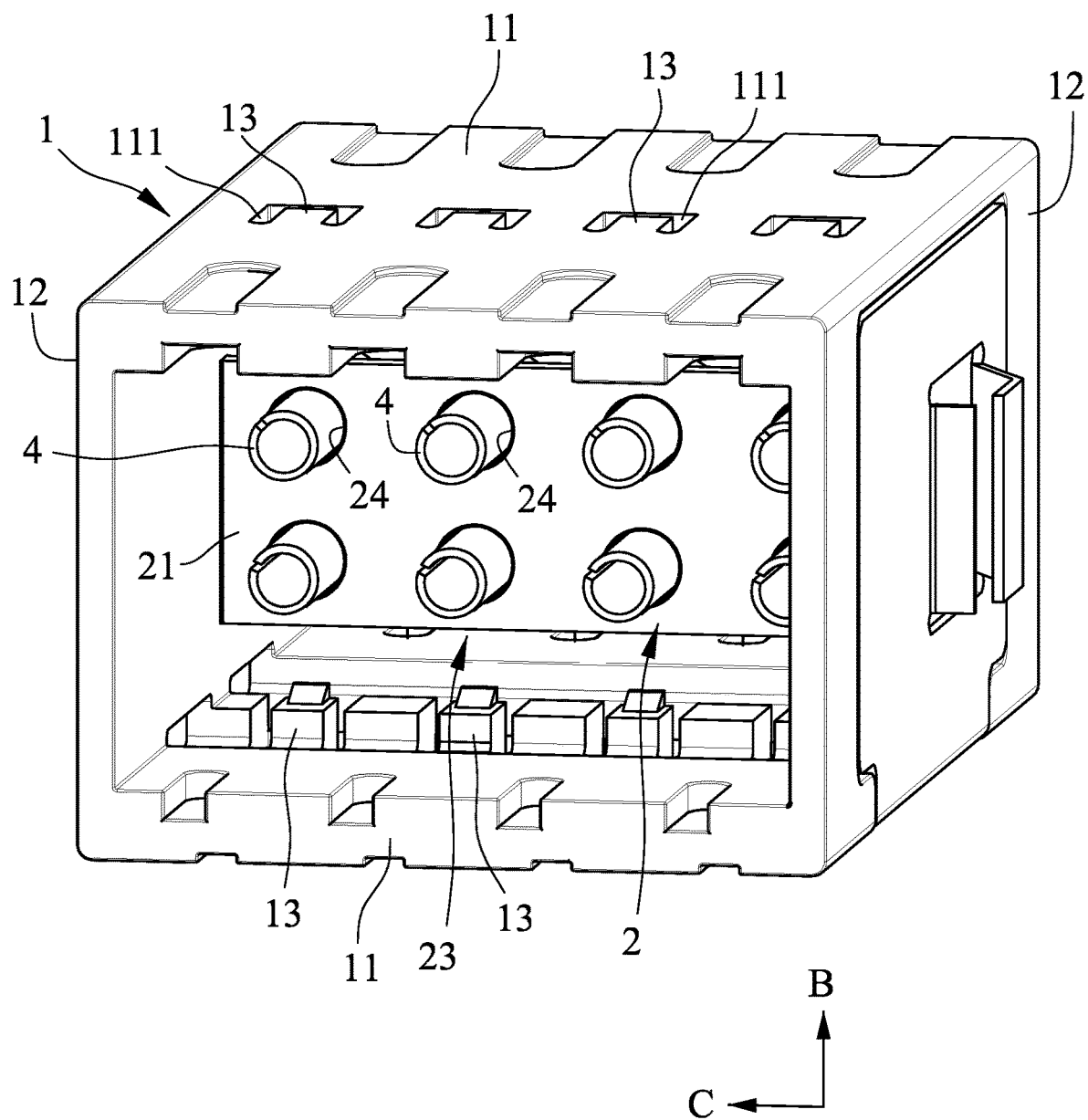
FIG. 4 is a rear perspective view of the embodiment.

As shown in FIGS. 1, 2, and 4, the housing 1 includes two outer walls 11, two side walls 12, and eight latches 13. The two outer walls 11 are spaced apart from each other in a top-bottom direction (B). Each of the outer walls 11 is formed with four slots 111 spaced apart from each other in a lateral direction (C). The two side walls 12 extend in the top-bottom direction (B). Each of the side walls 12 is connected between the outer walls 11. The eight latches 13 are disposed on the outer walls 11. Each of the latches 13 extends from a corresponding one of the outer walls 11 in the front-rear direction (A) into a corresponding one of the slots 111. In this embodiment, the outer walls 11 and the side walls 12 surround and define a channel 14 extending in the front-rear direction (A) and in spatial communication with the slots 111. Each of the latches 13 is resiliently deflectable in the top-bottom direction (B) relative to the corresponding outer wall 11, and has a nose portion 130 that has an inclined surface inclined relative to the corresponding outer wall 11 and that faces the channel 14 such that during assembly of the optical fiber adapter, the nose portion 130 is moved resiliently and outwardly away from the channel 14 when an external force is applied thereto, and moves resiliently and inwardly toward the channel 14 when the external force is removed.

Figure 3:
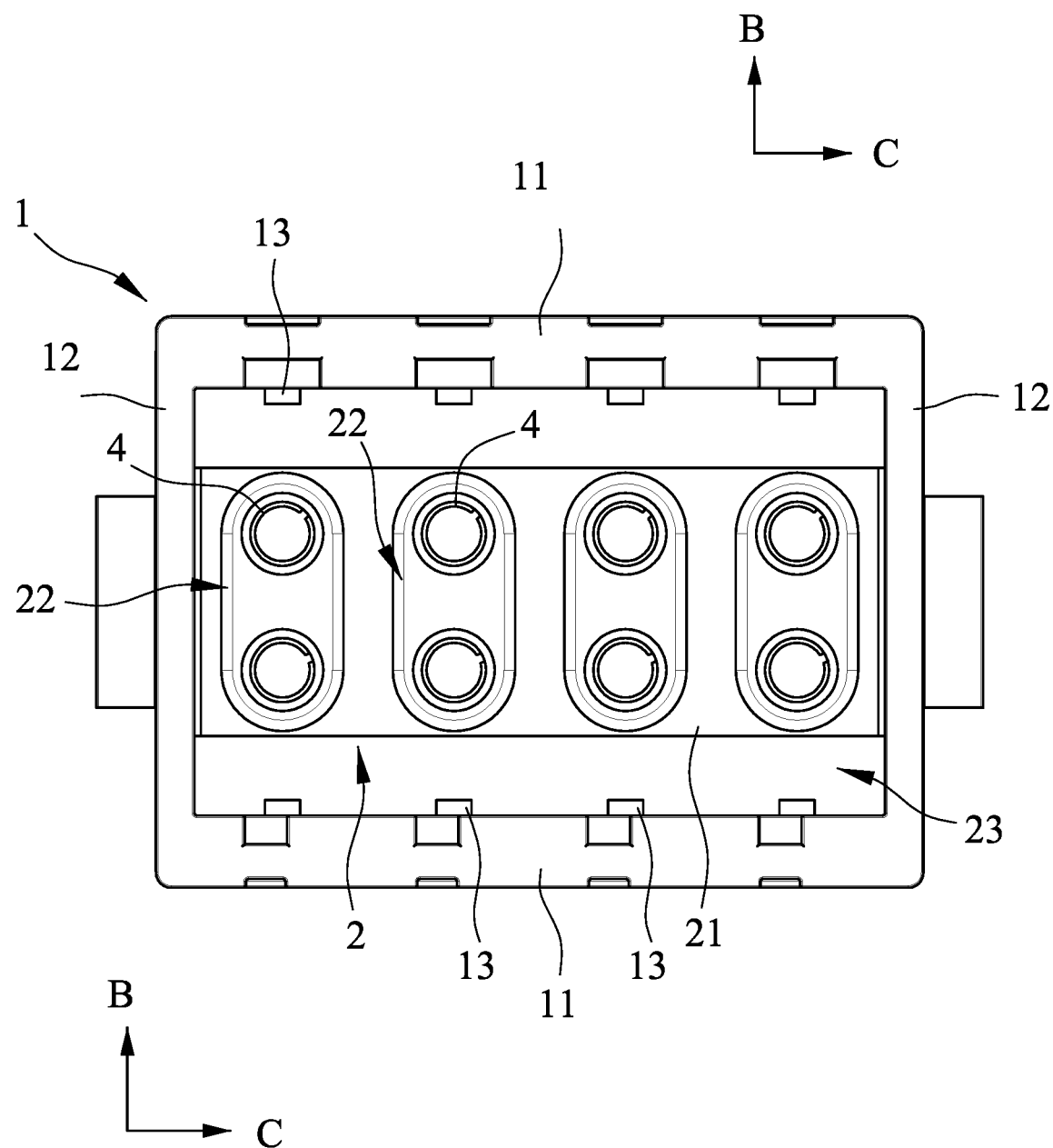
FIG. 3 is a front view of the embodiment.

As shown in FIGS. 2 to 4, the positioning member 2 is disposed within the channel 14, extends in the lateral direction (C), and divides the channel 14 into two insertion regions 141 (i.e., a front insertion region 141 and a rear insertion region 141) in the front-rear direction (A). The positioning member 2 includes a blocking portion 21 and four guiding seat portions 22. The blocking portion 21 extends in the lateral direction (C) and is connected between the side walls 12. Each of the four guiding seat portions 22 protrudes forwardly from the blocking portion 21 into one of the insertion regions 141. The blocking portion 21 cooperates with the outer walls 11 to define respectively two gaps 23 spaced apart from each other in the top-bottom direction (B) and in spatial communication with the insertion regions 141 in the front-rear direction (A). The positioning member 2 further includes eight connecting holes 24 that extend in the front-rear direction (A) through the blocking portion 21 and the guiding seat portions 22 and that communicate with the insertion regions 141.

Figure 5:
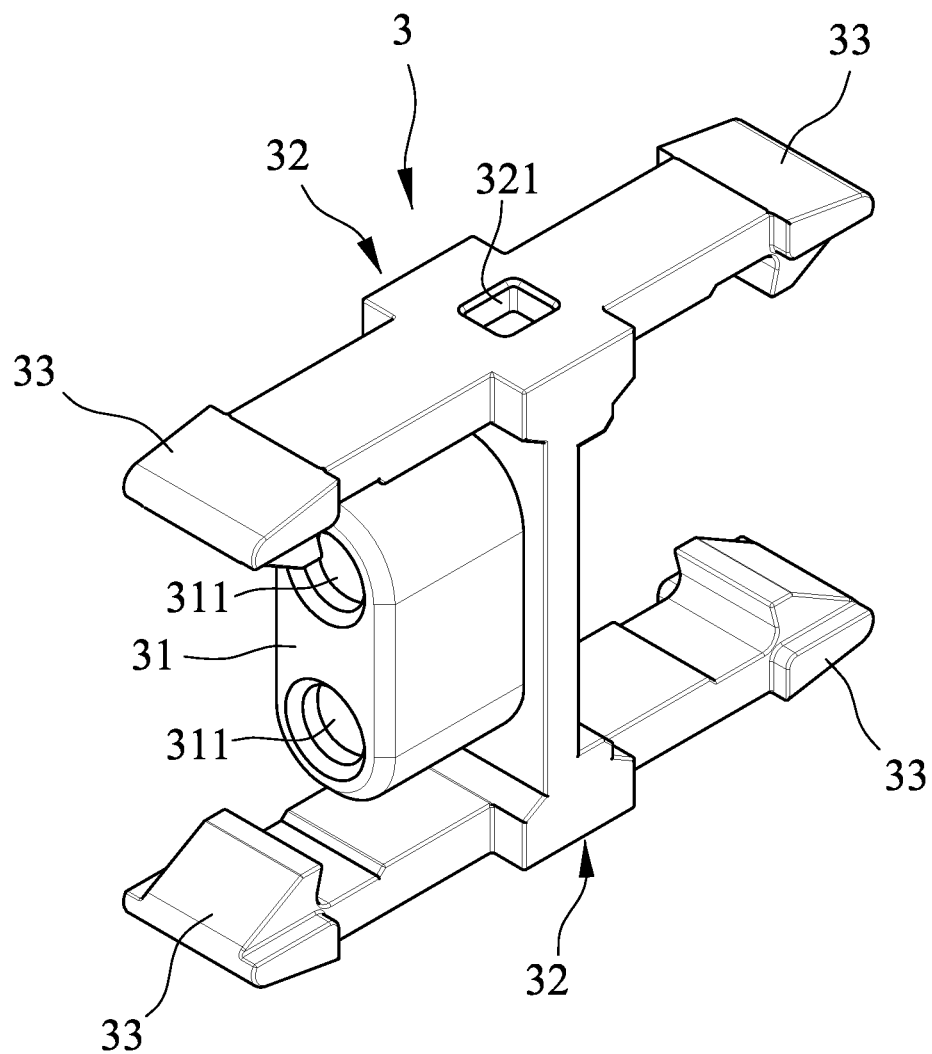
FIG. 5 is a perspective view of a clip member of the optical fiber adapter.

Referring to FIG. 5, in combination with FIGS. 1 and 2, each of the clip members 3 includes a base portion 31, two connection portions 32, two pairs of clip arm portions 33, and two guiding holes 311. For each clip member 3, the base portion 31 extends in the top-bottom direction (B) and is disposed behind and abuts against the blocking portion 21 of the positioning member 2; the two connection portions 32 are respectively disposed on two ends of the base portion 31 opposite to each other in the top-bottom direction (B); each of the connection portions 32 has an engaging groove 321 that is indented inwardly therein and that is engaged with a respective one of the latches 13; the two pairs of the clip arm portions 33 extend respectively from the connection portions 32 in the front-rear direction (A); the clip arm portions 33 (i.e., the front clip arm portion 33 and the rear clip arm portion 33) of each pair extend away from each other; and the two guiding holes 311 extend in the front-rear direction (A) through the base portion 31 and are spaced apart from each other in the top-bottom direction (B).

Each of the clip members 3 is inserted forwardly into the channel 14. During forward insertion of each clip member 3, when the base portion 31 moves toward the blocking portion 21 of the positioning member 2, the front clip arm portion 33 moves into the front insertion region 141 through a corresponding one of the gaps 23, and the rear clip arm portion 33 moves into the rear insertion region 141. At the same time, two corresponding latches 13 spaced apart in the top-bottom direction (B) are pushed by the connecting portions 32 of the clip member 3 to move away from each other in the top-bottom direction (B) until the engaging grooves 321 of the connection portions 32 of the clip member 3 are engaged partially with the nose portions 130 of the corresponding latches 13 and the base portion 31 of the clip member 3 abuts against the blocking portion 21 of the positioning member 2, so that the corresponding latches 13 resiliently move toward each other and are thus respectively and entirely engaged with the engaging grooves 321 of the connection portions 32 of the clip member 3. As shown in FIG. 2, because the nose portions 130 of the latches 13 abut against portions of the groove walls 3210 defining the engaging grooves 321, and because the base portion 31 of the clip member 3 abuts against the blocking portion 21 of the positioning member 2, the clip member 3 is prevented from moving with respect to the positioning member 2. Specifically, after the clip member 3 is assembled within the channel 14, the base portion 31 of the clip member 3 is spaced apart from the guiding seat portions 22 of the positioning member 2 and abuts against the blocking portion 21 of the positioning member 2. Each of the guiding holes 311 of the clip member 3 is aligned with a respective one of the connecting holes 24 of the positioning member 2. Each of the sleeves 4 is inserted into a corresponding one of the connecting holes 24 of the positioning member 2 and a corresponding one of the guiding holes 311.

To remove the clip member 3 from the channel 14 of the housing 1, the corresponding latches 13 can be pulled outwardly from the corresponding ones of the slots 111 of the outer walls 11 by tools. When the corresponding latches 13 are disengaged from the engaging grooves 321 of the clip member 3, the clip member 3 can be removed rearwardly from the channel 14 with ease. By virtue of the corresponding latches 13 resiliently engaged with or disengaged from the engaging grooves 321 of the clip member 3, there is no need for an external force to be applied on the clip member 3 for removing the clip member 3, thereby preventing the optical fiber adapter of the disclosure from being damaged.

Referring back to FIG. 1, the housing 1 further has a shallow recess 112 formed in one of the side walls 12. A mount member 5 is disposed in the shallow recess 112 so that the optical fiber adapter of the disclosure can be installed to a cabinet (not shown) through the mount member 5 in an engagement manner. The number of the shallow recess 12 and the number of mount member 5 are not limited hereto. That is, the side walls 12 and the outer walls 11 may be formed with the shallow recesses 12 and the mount members 5.

Figure 6:
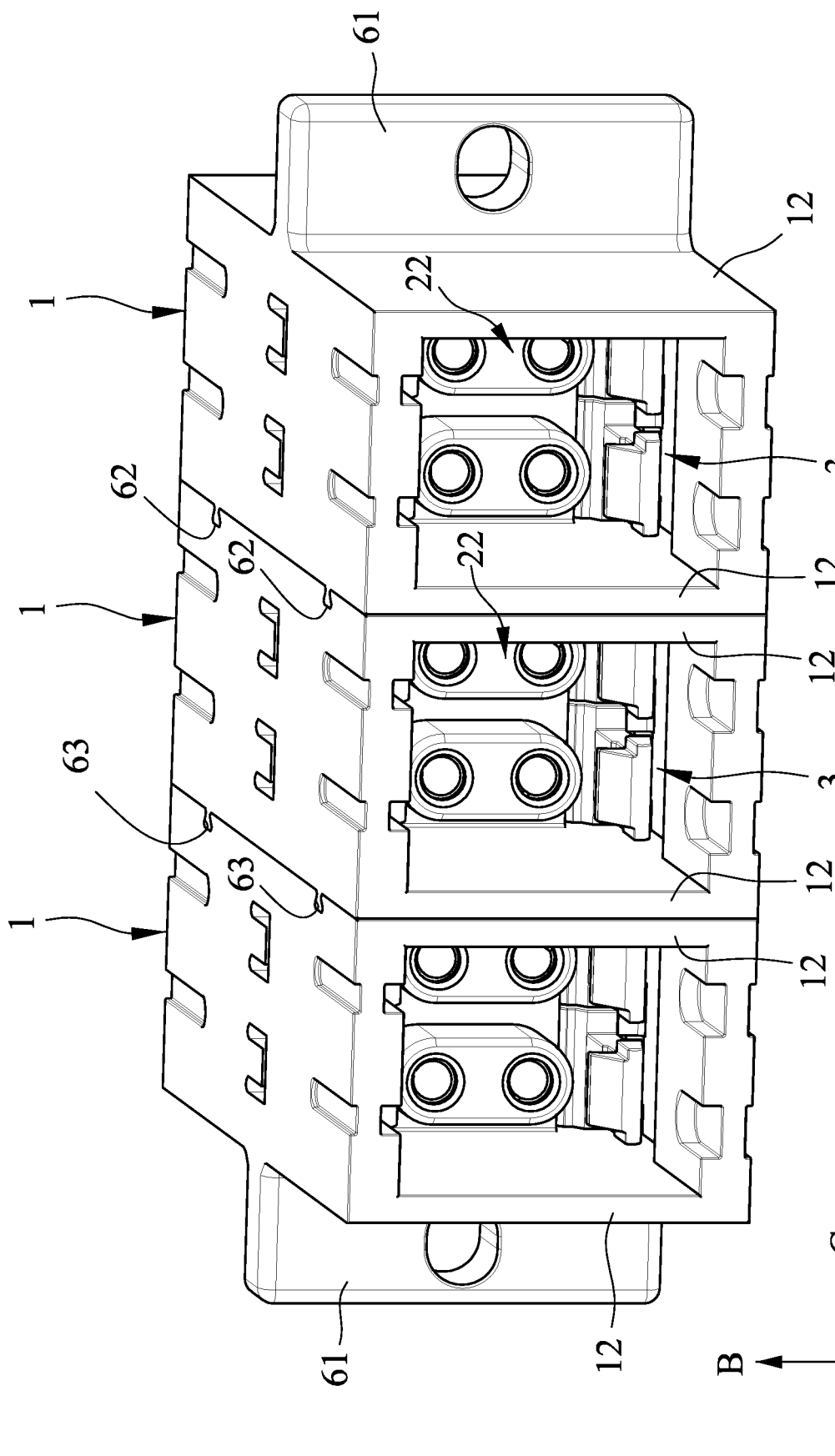
FIG. 6 is a perspective view illustrating an assembly of a plurality of optical fiber adapters of the disclosure.
Figure 7:
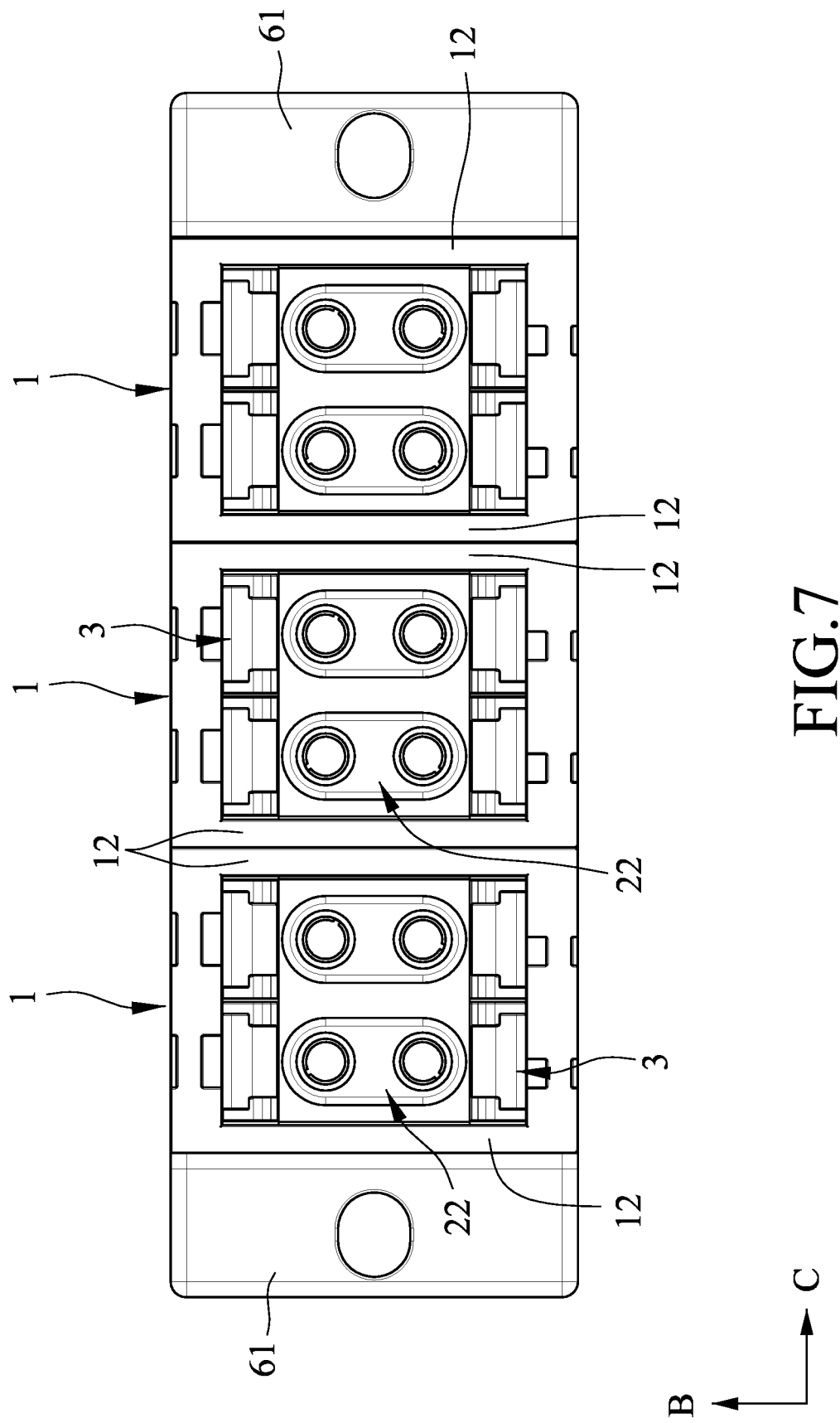
FIG. 7 is a front view of the assembly of FIG. 6.

FIGS. 6 and 7, illustrate three optical fiber adapters of a variant embodiment according to the disclosure. The three optical fiber adapters are juxtaposed to each other. Each of two outer ones of the three optical fiber adapters further includes a flange 61 extends outwardly from one of the side walls 12 thereof. Any two adjoining ones of the side walls 12 of the juxtaposed optical fiber adapters have a plurality of dovetail tongues 62 or a plurality of dovetail grooves 63. Through engagement of the dovetail tongues 62 and the dovetail grooves 62, the juxtaposed optical fiber adapters are connected to one another in series in the lateral direction (C). In addition, the juxtaposed optical fiber adapters can be fixed to a wall by screws (not shown) extending through the flanges 61. Noteworthily, the number of the guiding seat portions 22 and the number of the clip member 33 may vary according to the requirements. Based on design in quantity and configuration requirements, the optical fiber adapter of the disclosure can be manufactured in a modular manner.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An optical fiber adapter, comprising:
   a housing including
      two outer walls spaced apart from each other in a top-bottom direction, each of said outer walls being formed with a plurality of slots spaced apart from each other in a lateral direction,
      two side walls which extend in the top-bottom direction and each of which is connected between said outer walls, and
      a plurality of latches disposed on said outer walls, each of said latches extending from a corresponding one of said outer walls in a front-rear direction into a corresponding one of said slots,
      said outer walls and said side walls surrounding and defining a channel extending in the front-rear direction and in spatial communication with said slots;
   a positioning member disposed within said channel and extending in the lateral direction; and
   at least one clip member removably disposed within said channel, and including
      a base portion extending in the top-bottom direction,
      two connection portions respectively disposed on two ends of said base portion opposite to each other in the top-bottom direction, each of said connection portions having an engaging groove that is indented inwardly therein and that is engaged with a respective one of said latches, and
      two pairs of clip arm portions extending respectively from said connection portions in the front-rear direction, said clip arm portions of each pair extending away from each other.

2. The optical fiber adapter as claimed in claim 1, wherein:
   said positioning member divides said channel into two insertion regions in the front-rear direction, and cooperates with said outer walls to form respectively two gaps spaced apart from each other in the top-bottom direction and in spatial communication with said insertion regions in the front-rear direction; and
   said at least one clip member is removably disposed within said channel, one of each pair of said clip arm portions extending from a corresponding one of said connection portions extending into one of said insertion regions through a corresponding one of said gaps, the other one of each pair of said clip arm portions extending from the corresponding one of said connecting portions extending into the other one of said insertion regions.

3. The optical fiber adapter as claimed in claim 2, wherein:
   said positioning member includes a blocking portion that extends in the lateral direction and that is connected between said side walls, at least one guiding seat portion protruding in the front-rear direction from said blocking portion into one of said insertion regions, and a plurality of connecting holes that extend in the front-rear direction through said blocking portion and said at least one guiding seat portion and that communicate with said insertion regions; and
   said blocking portion cooperates with said outer walls to define said gaps.

4. The optical fiber adapter as claimed in claim 3, wherein:
   said positioning member includes two of said connecting holes;
   said at least one clip member has two guiding holes that extend in the front-rear direction through said base portion thereof and that are spaced apart from each other in the top-bottom direction; and
   said base portion of said at least one clip member abuts against said blocking portion of said positioning member, each of said guiding holes of said at least one clip member being aligned with a respective one of said connecting holes of said positioning member.

5. The optical fiber adapter as claimed in claim 4, further comprising two sleeves inserted into said positioning member and said at least one clip member, each of said sleeves being inserted into a corresponding one of said connecting holes of said positioning member and a corresponding one of said guiding holes of said at least one clip member.

* * * * *